United States Patent
Watté et al.

(10) Patent No.: US 8,295,667 B2
(45) Date of Patent: Oct. 23, 2012

(54) HOLE ARRANGED PHOTONIC CRYSTAL FIBER FOR LOW LOSS, TIGHT FIBER BENDING APPLICATIONS

(75) Inventors: Jan Watté, Grimbergen (BE); Jürgen Van Erps, Tervuran (BE); Tomasz Nasilowski, Brussels (BE); Christof Debaes, Lot (BE); Hugo Thienpont, Gooik (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 194 days.

(21) Appl. No.: 12/452,457

(22) PCT Filed: Jul. 2, 2008

(86) PCT No.: PCT/GB2008/002279
§ 371 (c)(1),
(2), (4) Date: Dec. 31, 2009

(87) PCT Pub. No.: WO2009/004338
PCT Pub. Date: Jan. 8, 2009

(65) Prior Publication Data
US 2010/0135616 A1    Jun. 3, 2010

(30) Foreign Application Priority Data
Jul. 2, 2007   (GB) .................................. 0712740.0

(51) Int. Cl.
*G02B 6/26* (2006.01)
*G02B 6/36* (2006.01)
*G02B 6/42* (2006.01)

(52) U.S. Cl. ............ 385/125; 385/31; 385/98; 385/123; 385/127

(58) Field of Classification Search ..................... 385/31, 385/95, 96, 97, 98, 123, 125, 126, 127, 122
See application file for complete search history.

(56) References Cited

U.S. PATENT DOCUMENTS

| 5,138,676 A | 8/1992 | Stowe et al. |
| 5,907,652 A | 5/1999 | DiGiovanni et al. |

(Continued)

FOREIGN PATENT DOCUMENTS
WO    WO 2004/053550 A    6/2004

OTHER PUBLICATIONS

Magi, E.C. et al., "Air-hole collapse and mode transitions in microstructured fiber photonic wires", Lasers and Electro-Optics, 2005 (CLEO), vol. 1, May 22, 2005, pp. 53-55.

(Continued)

*Primary Examiner* — Brian M. Healy
*Assistant Examiner* — Mary El Shammaa
(74) *Attorney, Agent, or Firm* — Faegre Baker Daniels LLP

(57) ABSTRACT

A microstructured fiber or photonic crystal fiber is described having a doped solid core region and a cladding region, holes being provided in the cladding region, the fiber having a low hybrid splice loss to conventional fiber as well as being able to be tightly bent due to the microstructured cladding. The cladding region can contain a plurality of holes surrounding and distanced from the core. These holes are preferably located symmetrically around the core and extend longitudinally along the length of fiber. The holes may be two or more D-shaped holes or truncated D-shaped holes arranged symmetrically around the care. In other embodiments, the holes comprise hole structures arranged symmetrically around the core in a ring. The holes may be arranged having the inner side facing the core formed from arcs of a circle, e.g. equal arcs of a circle. Between the arcs circular holes may be provided called capillaries, i.e. smaller holes. According to the present invention, any number of holes may surround the core, preferably three or more. The fiber has low loss at small bending radii.

24 Claims, 12 Drawing Sheets

U.S. PATENT DOCUMENTS

2005/0069269 A1  3/2005  Libori et al.
2006/0130528 A1  6/2006  Nelson et al.
2006/0263024 A1  11/2006  Dong et al.

OTHER PUBLICATIONS

Search Report and Written Opinion for PCT/GB2008/002279 issued by the European Patent Office on Jan. 7, 2009.

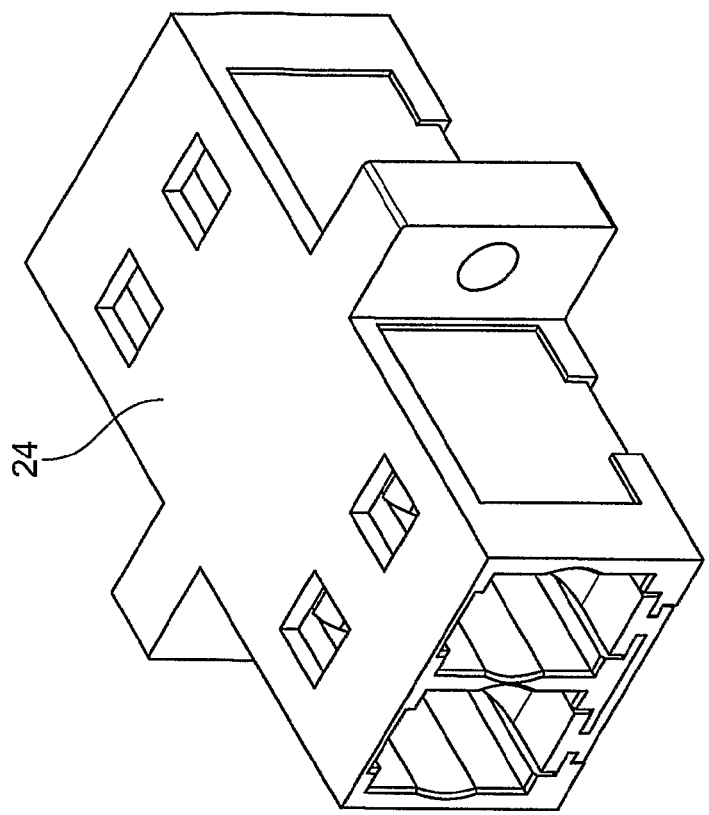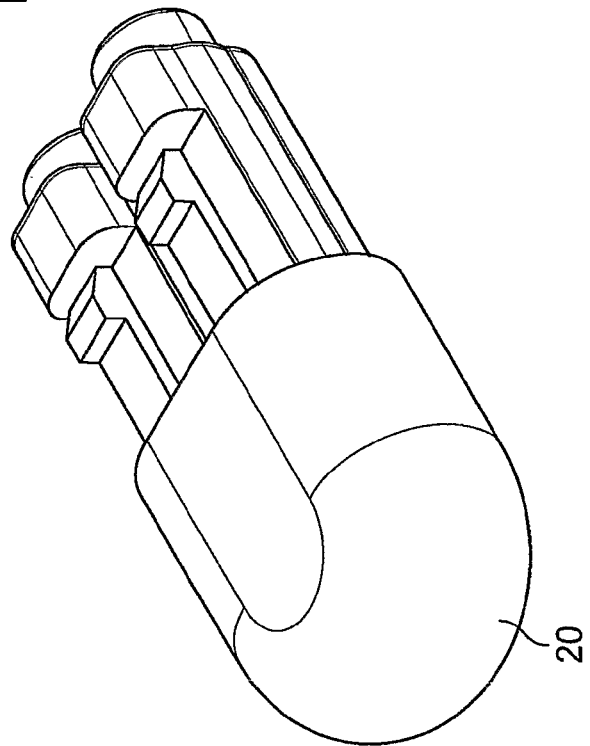
FIG. 12D

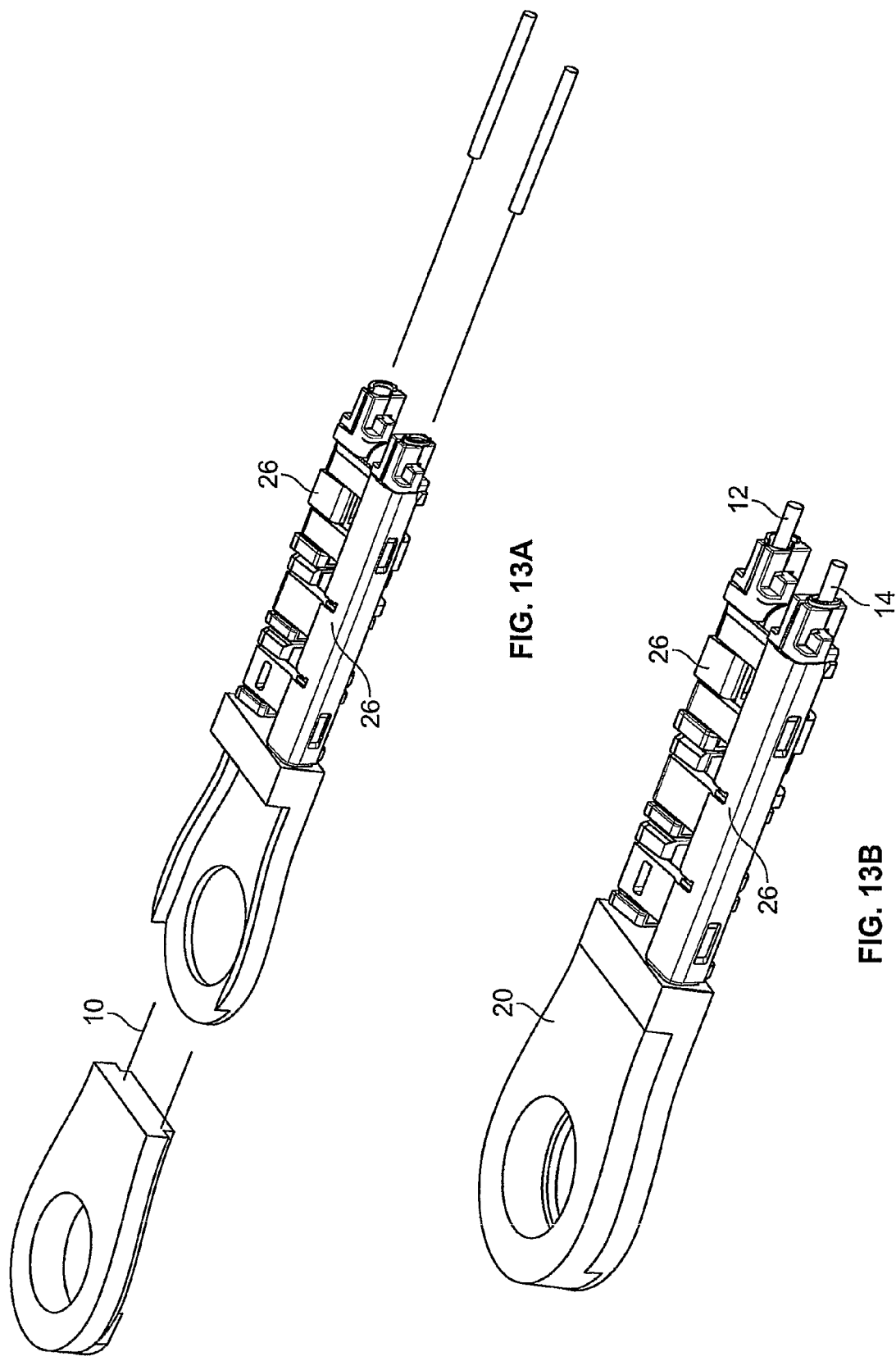

HOLE ARRANGED PHOTONIC CRYSTAL FIBER FOR LOW LOSS, TIGHT FIBER BENDING APPLICATIONS

FIELD OF THE INVENTION

The present invention is directed to a hole-assisted optical fiber device and methods of making and using the same. The present invention also relates to optical devices such as butt couplers for coupling light between ends of at least two optical fibers and methods of making the same.

TECHNICAL BACKGROUND

Optical fibers, conventionally have glass-based filaments that have a core surrounded concentrically by one or more cladding layers having appropriate indices of refraction to guide light by total internal reflection. The outer cladding layer likewise is typically covered by an external layer. The optical fiber can be designed to be a single mode fiber or a multi-mode fiber.

Fiber designs have been proposed with hollow cores, sometimes referred to as "holey fibers" or "photonic crystal" fibers (PCF) or microstructured fiber. Known methods of making microstructured or PCF fibers include using stacked arrays of cylindrical tubing or capillaries and/or drilling longitudinal holes or bores into a fiber preform.

JP2005-338436 describes a hole assisted optical fiber which comprises a ring of holes in a cladding around a core. The size and number of holes is defined by formulae that define a maximum of about 61% hole: 39% glass for the amount of hole around a circle going through the holes.

In optical distribution frames widely used today, single mode fibers from the central office cable have to be patched to fibers going to the subscriber, i.e. optical network units (ONU). The fibers coming from the central office and from the subscriber are generally coming from below the ground, and therefore it has been necessary to provide a fiber loop inside the network hub when two parallel positioned fibers are to be connected or spliced in-line. The spare length of fiber required because of the in-line splicing configurations used until now, results in storage and management problems, increasing the size of the connector cabinets and the complexity of the tasks involved in making and changing connections.

SUMMARY OF THE INVENTION

According to a first aspect of the present invention, a microstructured fiber or photonic crystal fiber is provided having a doped solid core region and a cladding region, holes being provided in the cladding region, the fiber having a low hybrid splice loss to conventional fiber as well as being able to be tightly bent due to the microstructured cladding. In accordance with an aspect of the present invention, cladding region contains a plurality of holes surrounding and distanced from the core. These holes are preferably located symmetrically around the core and extend longitudinally along the length of fiber. The holes may be two or more D-shaped holes or truncated D-shaped holes arranged symmetrically around the care. In other embodiments, the holes comprise hole structures arranged symmetrically around the core in a ring. The holes may be arranged having the inner side facing the core formed from arcs of a circle, e.g. equal arcs of a circle. Between the arcs circular holes may be provided called capillaries, i.e. smaller holes. According to the present invention, any number of holes may surround the core, preferably three or more.

In embodiments of the present invention a large amount of the glass as defined by superimposing a circle on the cladding and centred on the core and determining how much of the material cut by the circle is holes and how much is cladding. The position of the circle should be chosen so that the amount of material of the cladding which is holes cut by the circle is a maximum. In accordance with embodiments of the present invention, the material cut by at least one such circle comprises, e.g. more than 60%, more than 70%, more than 80% or more than 90% or more than 95% of holes rather than cladding. The fiber has the advantage of improved bend performance due to the presence of the holes. These holes may be arranged having an inner edges defined by arcs of a circle around the core region and extending radially outwards. Between the arcs smaller circular holes may be arranged, termed capillaries. The fiber may be bent to 5 mm or less radius.

According to a second aspect of the present invention, a butt coupler is provided for coupling light between ends of at least two optical fibers, the ends facing in substantially the same direction as each other, wherein the coupler comprises a length of light guide member curved approximately or exactly 90 or approximately or exactly 180° around a radius of 5 mm or less, or to any intermediate angle, and comprises holding means holding opposite ends of the light guide member at a distance from each other corresponding to the separation distance at which the respective ends of the said optical fibers are to be coupled, wherein the said light guide member is a length of hole-assisted photonic crystal optical fiber (HA-PCF) in accordance with embodiments of the present invention. The present invention in particular relates to a fused-fiber optical coupler. The present invention also provides a mechanical or plug-in coupler. The fibers may be aligned, e.g. using an aligner or non-aligned. For example, the end facets of incoming and outgoing fibers can be brought together at the front panel of a frame by means of the HA-PCF that bends the light over an angle, e.g. 180°. The present invention allows connection of two parallel positioned fibers by a socket, e.g. to avoid the necessity to make a loop inside a network hub when those fibers are to be connected or spliced in-line. The connections can be permanent or demountable.

Embodiments of the present invention allow a spare length of fiber to be provided at an optical coupler that can be joined using a suitable plug. This approach also enables field installing by low cost labor force. Another advantage of the present invention is to provide connections between optical fibers with a simple plug-in arrangement so that the fibers do not need to be positioned accurately in line with one another. Also the present invention enables an increase of fiber density in the rack and facilitates fiber identification The HA-PCF is a low radius bending, low loss hole-assisted fiber able to connect the end facets of the parallel positioned fibers.

The HA-PCF for use in the butt coupler may be a hole-assisted fiber comprising a core glass region and a cladding glass region, wherein the cladding glass region includes multiple holes spaced apart from each other to surround the core glass region. In accordance with an aspect of the present invention, cladding region contains a plurality of holes surrounding and distanced from the core. These holes are preferably located symmetrically around the core and extend longitudinally along the length of fiber. The holes may be two D-shaped holes or truncated D-shaped holes arranged symmetrically around the care. In other embodiments, the holes comprise more hole structures arranged symmetrically around the core in a ring. The holes may be arranged having an inner edges defined by arc, e.g. equal arcs of a circle and extending outwards radially. Between the arcs circular holes may be provided called capilliaries. According to the present invention, any number of holes may surround core, preferably three or more.

In embodiments of the present invention a large amount of the cladding as viewed around at least one circle within the cladding centered on the core comprises, e.g. more than 60%, more than 70%, more than 80% or more than 90% or more than 95% made of the holes. The position of the circle should be chosen so that the amount of material of the cladding which is holes cut by the circle is a maximum. The fiber has the advantage of improved bend performance due to the presence of the holes.

The holes in any of the embodiments of the present invention can be filled with a gas or liquid having an index of refraction less than that of the cladding glass. The holes may be arranged as arcs of a circle around the core region. Between the arcs smaller circular holes may be arranged, termed capillaries.

The above summary of the present invention is not to be exhaustive nor to describe each illustrated embodiment or every implementation of the present invention. The figures and the detailed description which follow show embodiments of the present invention in more detail.

BRIEF DESCRIPTION OF THE DRAWINGS

The present invention will be further described with reference to the accompanying drawings which are attached below.

FIGS. 11-13 show optical devices using optical fibers according to any of the embodiments of the present invention.

DETAILED DESCRIPTION OF THE EMBODIMENTS

Figure 1A:
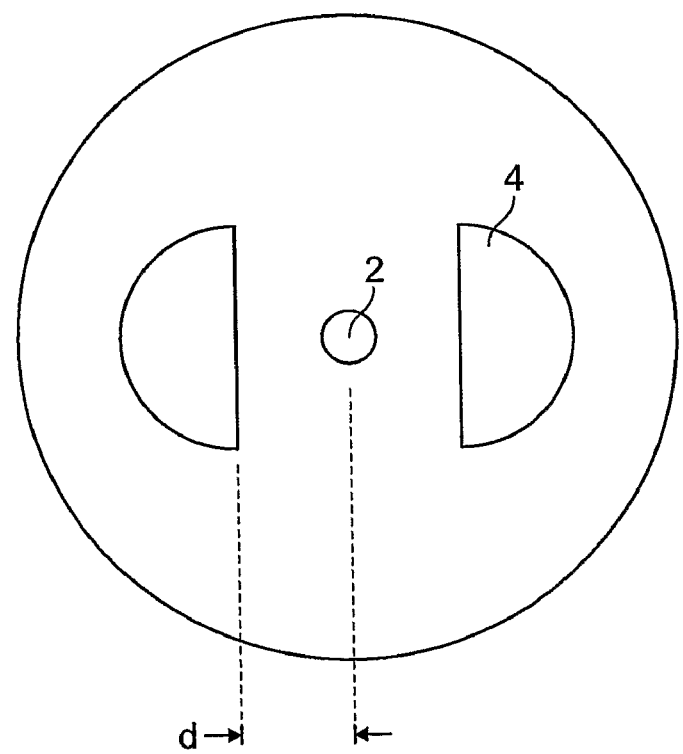
FIGS. 1 to 5 show optical fibers according to embodiments of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first and second and the like in the description and in the claims, are used for distinguishing between similar elements and not necessarily for describing a sequential or chronological order. It is to he understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The present invention is directed to a hole-assisted optical fiber device, in particular a butt coupler or other optical devices that can make use of the fiber according to the present invention. The present invention in particular relates to a fused-fiber optical coupler. However, the present invention is not limited thereto and includes a mechanical coupler, e.g. using a V groove to align the fibers in the coupler.

The hole-assisted fibers of the present invention can provide single mode operation over a wide bandwidth as well as multimode operation. The present invention provides fibers that may be coupled efficiently to single mode fibers. The hole assisted fibers provide greater bend tolerance due to control of the refractive index surrounding the core, i.e. by lowering it through the inclusion of holes.

The present invention provides novel microstructured fibers or photonic crystal fibers. The term microstructured or photonic crystal fibers are used synonymously. The present invention makes use of introducing holes into the cladding so that the light guiding properties of the fiber are engineered. Fibers in accordance with the present invention include a solid core with a microstructured cladding and has a low hybrid splice loss to conventional fiber as well as being able to be tightly bent due to the microstructured cladding. The core is preferably doped. Any suitable doping material may be used of which Ge is only one example. The fibers of the present invention do not necessarily fall into the category of photonic bandgap fibers, where the light is confined by a photonic bandgap created by the microstructured cladding.

A PCF optical fiber in accordance with embodiments of the present invention may comprise a core (or core region) and a cladding (or cladding region). The core and the cladding region may be made of a glass material, but could be made of any other suitable material. For example, the core can comprise a silica material, doped to modify the index of refraction or undoped. The cladding region can comprise a single cladding layer or multiple cladding layers. In addition, the cladding region may be constructed from materials other than glass, such as fluoropolymers, fluoroelastomers, and silicones, etc. Alternatively, core can comprise a central rod of a higher refractive index material. The core can have a diameter suitable for, a specific operation.

In addition, the optical fiber can comprise one or more coatings surrounding cladding region. One or more conventional buffer coatings may be applied longitudinally over the optical fiber. A protective coating my surround the cladding region.

In accordance with an aspect of the present invention, cladding region contains a plurality of holes surrounding and distanced from the core. These holes are preferably located symmetrically around the core and extend longitudinally along the length of fiber. The holes may he two D-shaped holes or truncated D-shaped holes arranged symmetrically around the care. In other embodiments, the holes comprise more hole structures arranged symmetrically around the core in a ring. The holes may be arranged as equal arcs of a circle. Between the arcs circular holes may be provided called capillaries. According to the present invention, any number of holes may surround core, preferably three or more.

Figure 14A:
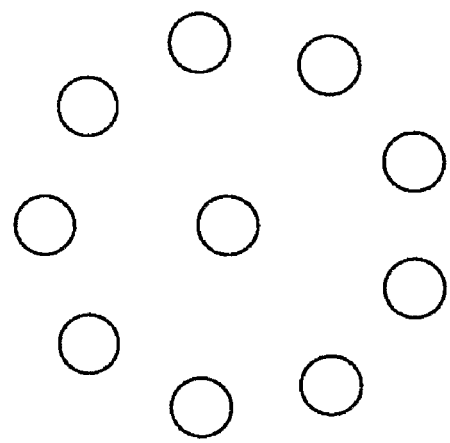
FIG. 14 is a schematic diagram used to determine hole/cladding ratios.
Figure 14B:
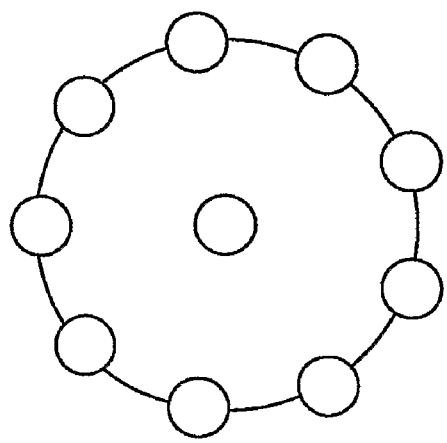

In embodiments of the present invention a large amount of the glass or other cladding material in one circle within the cladding and centered on the core comprises the holes, e.g.

more than 60%, more than 70%, more than 80% or more than 90% or more than 95%. The fiber has the advantage of improved bend performance due to the presence of the holes. The method of determining in the amount of holes and cladding is shown schematically in FIGS. 14a and b, FIG. 14a shows a fibre with a central core and holes arranged concentrically around it. As indicated in FIG. 14b at least one circle is superimposed on the cladding centered on the core and the amount of hole or cladding material cut by the circle is determined as a percentage of all the material cut by the circle. The position of the circle should be chosen so that the amount of material of the cladding which is holes cut by the circle is a maximum.

The one or more of the holes of the PCF fiber can be filled with a gas or liquid having a lower index of refraction than the surrounding cladding region. Preferably, the holes are filled with air to provide a low index of refraction for the individual hole regions. The presence of the plurality of holes surrounding the core lowers the refractive index of the cladding. In addition, the disposition of one or more holes closer to or farther from the core can he adjusted to match the single mode fiber to which it is coupled. As examples of suitable fibers, the present invention provides various embodiments of optical fibers.

Embodiment 1

Figure 1B:
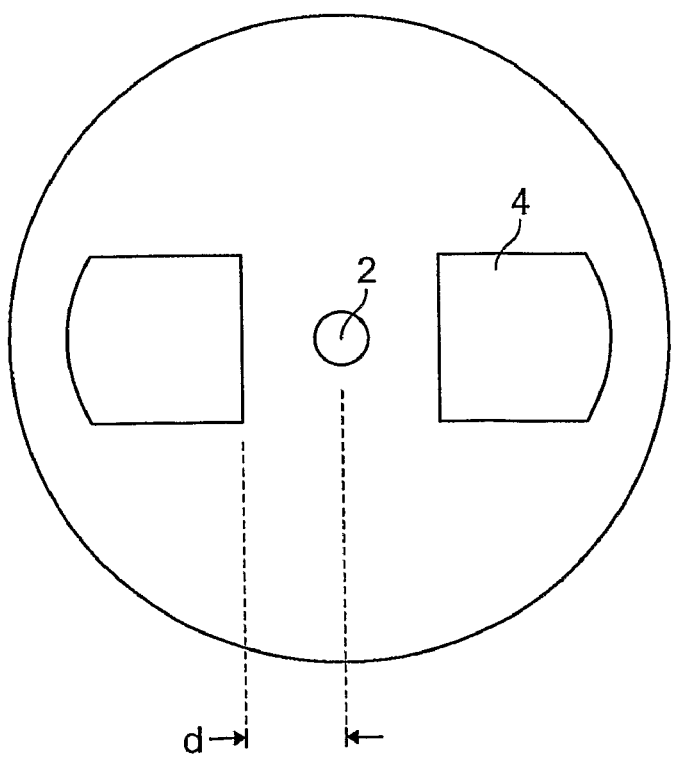

For example, FIGS. 1a and 1b show a doped core 2, with dual D hole shaped holes 4 in the cladding to form a pcf fiber that is tightly bendable in one plane (Embodiment I), e.g. to a radius of 5 mm. Tables 1 and 2 give the simulation results on this fiber. Table 1 shows dedicated settings of d (spacing between core center and the hole edge), R hole (the holes are half circles of radius R), radius of the core and core doping. The doping may be Ge and the cladding may be silica. Values of total link loss of less than 0.7 dB more preferably less than 0.6 dB, most preferably less than 0.5 dB are considered to be good at 5 mm radius bend through 180°, i.e. within the scope of the present invention. As these are loss values they may also be given a negative value in which case a preferred loss should be a lower than the absolute value of these losses. FIG. 1a shows two D-shaped holes in the cladding 4, arranged symmetrically about a core 2 with the flat sides of the "D" facing each other. Each D-shaped hole may be a half-circle of radius "R". There is a space "d" between the center of the core and the flat surface of the "D".

FIG. 1b shows two truncated D-shaped holes located symmetrically around a core 2.

Figure 2A:
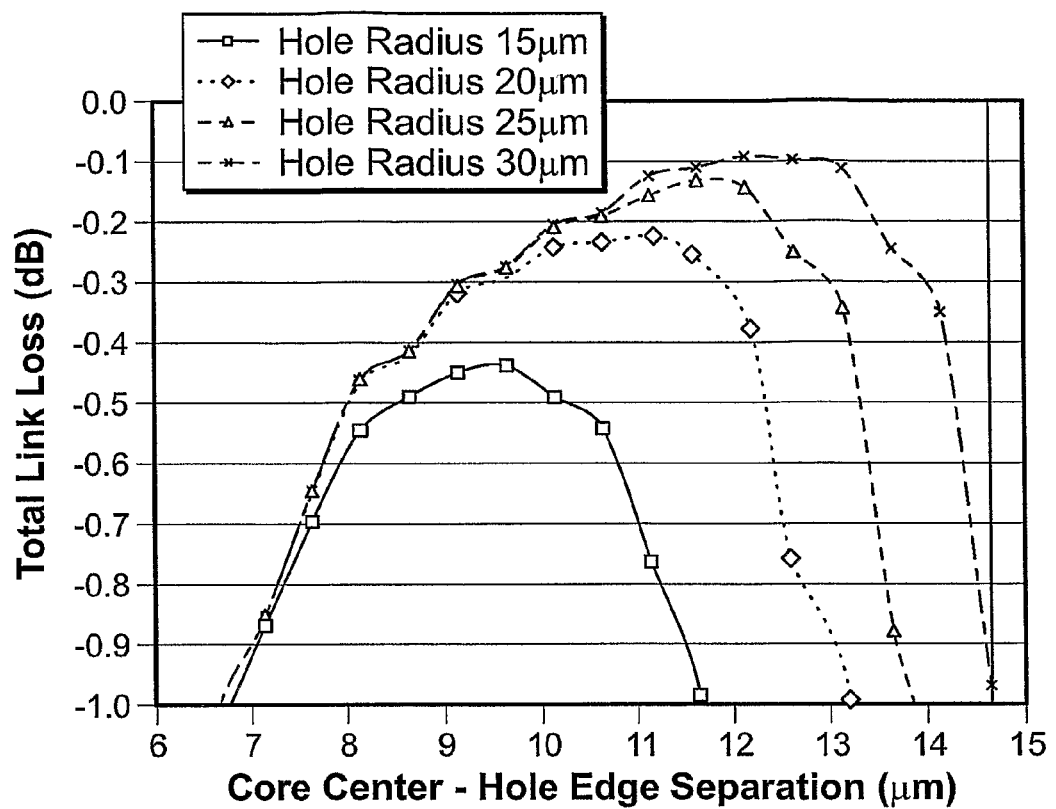

FIG. 2a shows the total link loss as a function of hole radius R and position d whereby the total link loss is defined by the total link loss at 1550 nm plus the total link loss at 1310 nm. Total loss simulated for 2 couplings of pcf fiber to smf-28 fibre in 180° geometry. From the figure it can be seen that a low link loss can be obtained for reasonably small values of the spacing "d", i.e. a large amount of the material around the core is formed by hole. For example using values of d down to 8 or 9 micron. Pareto analysis has shown that there are only two parameters that are significant for both total link loss and bending loss—the distance "d" (spacing between core center and the hole edge) and the radius "R" (the holes are each parts of a half circle of radius R. The lower the value of d and the higher the value of R, the better the results as shown in Table 1.

TABLE 1

| StdOrder | RunOrder | PtType | Blocks | d center | R hole | dop core | radius core | bending loss | total link loss |
|---|---|---|---|---|---|---|---|---|---|
| 1 | 1 | 1 | 1 | 14 | 20 | 1.4247 | 4 | 2.106 | 2.266 |
| 2 | 2 | 1 | 1 | 14 | 30 | 1.4245 | 4.3 | 0.356 | 0.508 |
| 3 | 3 | 1 | 1 | 11 | 30 | 1.4247 | 4 | 0.001 | 0.257 |
| 4 | 4 | 1 | 1 | 14 | 20 | 1.4247 | 4.3 | 1.599 | 1.768 |
| 5 | 5 | 1 | 1 | 14 | 30 | 1.4245 | 4.3 | 0.356 | 0.506 |
| 6 | 6 | 1 | 1 | 14 | 30 | 1.4247 | 4 | 0.396 | 0.556 |
| 7 | 7 | 1 | 1 | 11 | 30 | 1.4247 | 4.3 | 0.0005 | 0.264 |
| 8 | 8 | 1 | 1 | 11 | 20 | 1.4247 | 4.3 | 0.0489 | 0.313 |
| 9 | 9 | 1 | 1 | 11 | 20 | 1.4245 | 4.3 | 0.101 | 0.341 |
| 10 | 10 | 1 | 1 | 14 | 20 | 1.4245 | 4 | 2.758 | 2.908 |
| 11 | 11 | 1 | 1 | 11 | 30 | 1.4245 | 4 | 0.004 | 0.238 |
| 12 | 12 | 1 | 1 | 11 | 20 | 1.4245 | 4 | 0.195 | 0.429 |

TABLE 2

| StdOrder | RunOrder | PtType | Blocks | d center | R hole | diam core | tot link loss |
|---|---|---|---|---|---|---|---|
| 1 | 1 | 2 | 1 | 11 | 20 | 8.3 | 0.3457 |
| 2 | 2 | 2 | 1 | 15 | 20 | 8.3 | 5.53327 |
| 3 | 3 | 2 | 1 | 11 | 30 | 8.3 | 0.24659 |
| 4 | 4 | 2 | 1 | 15 | 30 | 8.3 | 1.79607 |
| 5 | 5 | 2 | 1 | 11 | 25 | 8 | 0.26228 |
| 6 | 6 | 2 | 1 | 15 | 25 | 8 | 3.39891 |
| 7 | 7 | 2 | 1 | 11 | 25 | 8.6 | 0.2575 |
| 8 | 8 | 2 | 1 | 15 | 25 | 8.6 | 2.52672 |
| 9 | 9 | 2 | 1 | 13 | 20 | 8 | 1.50794 |
| 10 | 10 | 2 | 1 | 13 | 30 | 8 | 0.24969 |
| 11 | 11 | 2 | 1 | 13 | 20 | 8.6 | 0.89406 |
| 12 | 12 | 2 | 1 | 13 | 30 | 8.6 | 0.20792 |
| 13 | 13 | 0 | 1 | 13 | 25 | 8.3 | 0.36095 |
| 14 | 14 | 0 | 1 | 13 | 25 | 8.3 | 0.36095 |
| 15 | 15 | 0 | 1 | 13 | 25 | 8.3 | 0.36095 |

The effect of these two parameters is to reduce the amount of cladding material in a circle concentric with the core 2 that passes through the D-shaped holes. This means that the ratio of cladding material to hole is low along that circle. Accordingly, a large amount of the glass or other cladding material in one circle within the cladding and centered on the core comprises the holes, e.g. more than 60%, more than 70%, more than 80% or more than 90% or more than 95%.

A more optimised figure for the link loss of coupling between a ha-pcf fiber to SMF-28 single mode fiber may be obtained from: Link loss=0.13908−4.0822 $10^{-4}$*width arms−0.0114656*inner radius−1.5079 $10^{-4}$*outer r increase−5.3875 $10^{-6}$*width arms*width arms+ 0.00336563*inner radius*inner radius−1.651 $10^{-5}$*outer r increase*outer r increase+2.6125 $10^{-5}$*width arms*inner radius−1 $10^{-8}$*width arms*outer r increase+2.145 $10^{-5}$*inner radius*outer r increase.

Figure 2B:
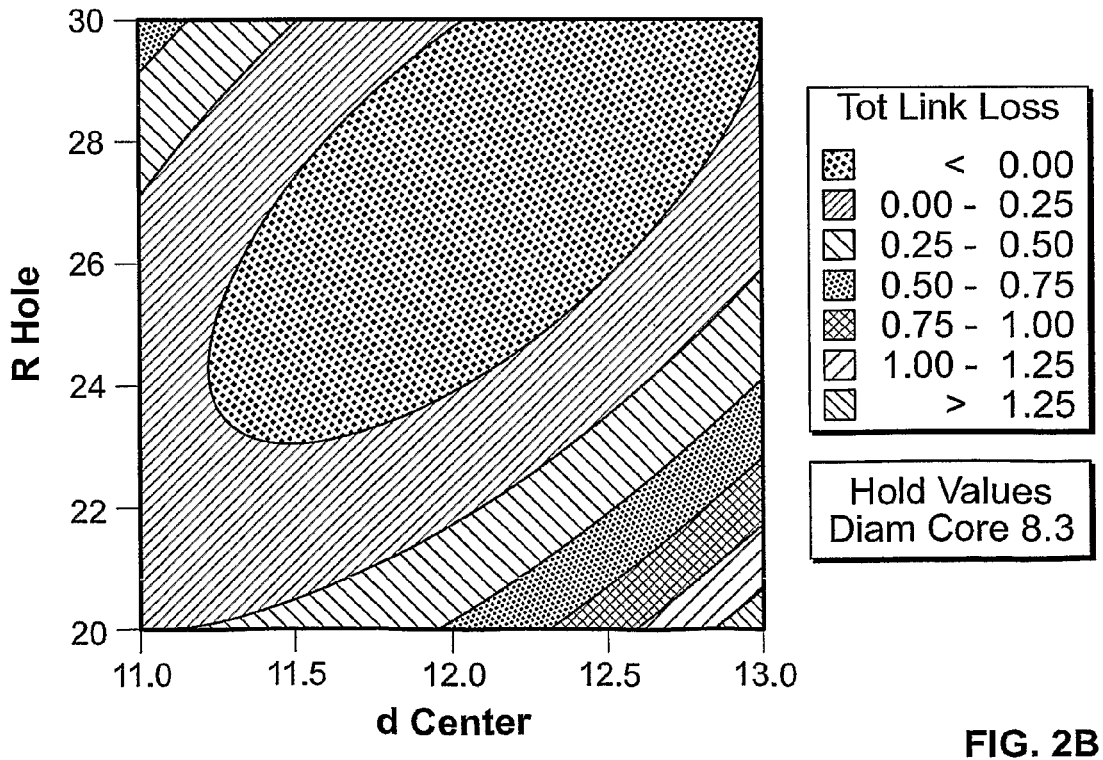
Figure 2C:
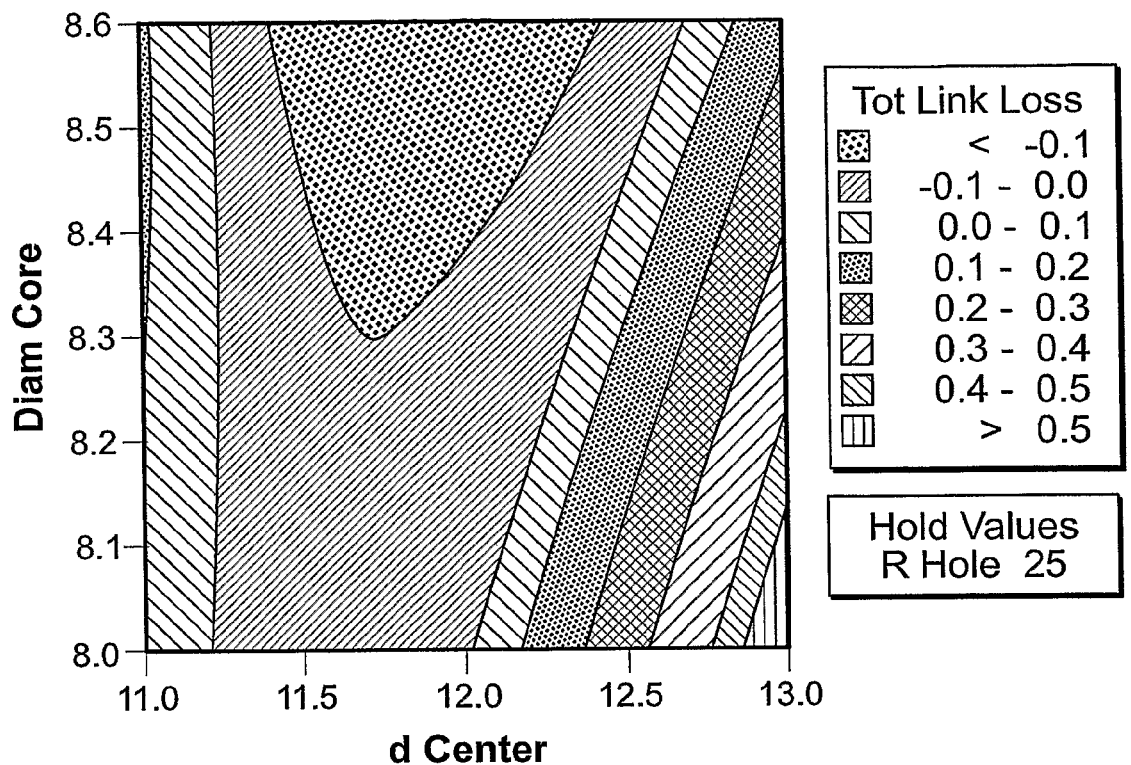

Further optimisations are shown in FIG. 2b and FIG. 2c. FIG. 2b shows total link loss as functions of R hole and d. Values of total link loss equal to or better than 0.5 dB, preferably equal to or better than 0.25 dB for 180) bend at 5 mm radius are considered to be in accordance with the invention (i.e. designs within zones A, B, C). FIG. 2c shows total link loss as functions of the diameter of the core and d. Values of total link loss equal to or better than 0.5 dB, preferably better than 0.4 dB and most preferably less than 0.3 dB for a 180° bend at 5 mm are considered to be in accordance with the invention (i.e. designs within zones A, B, C, D, E, F, G).

Embodiment 2

Figure 3A:
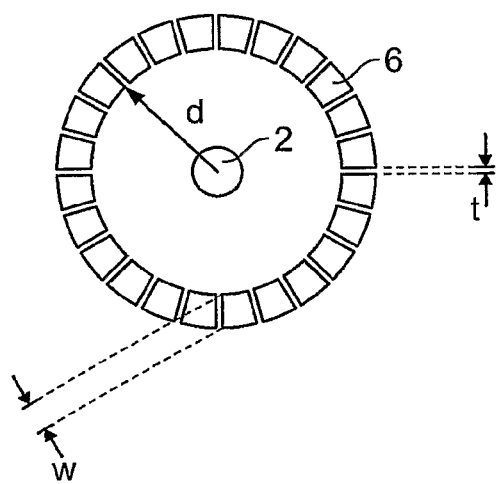
Figure 3B:
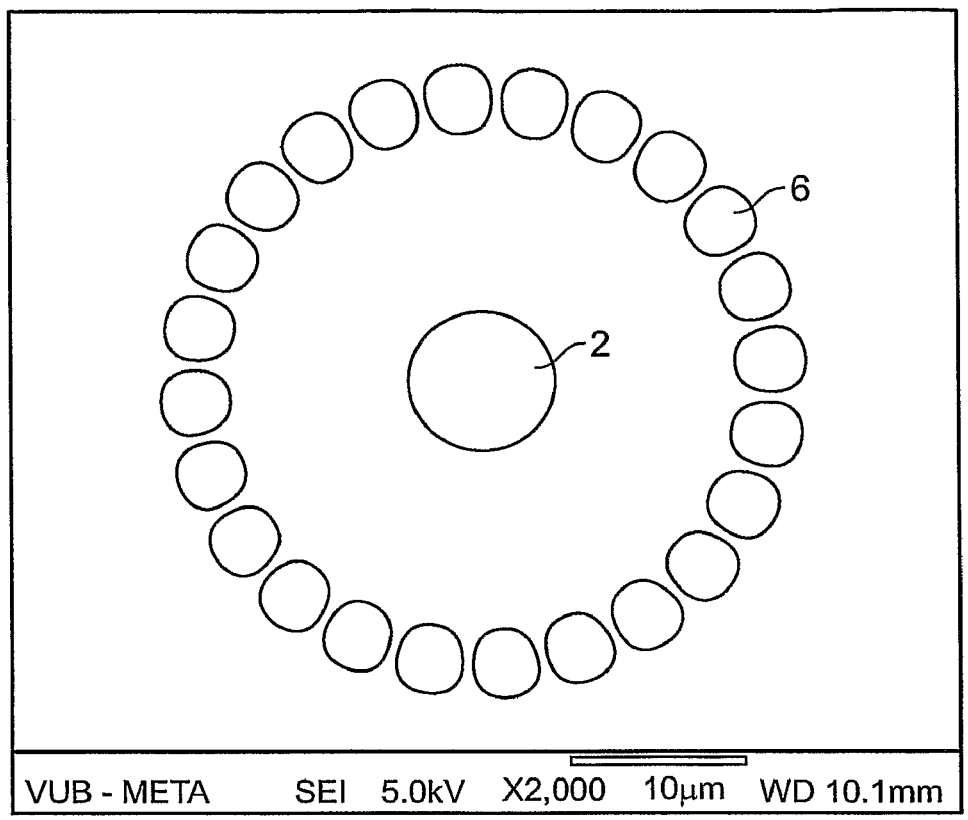

FIGS. 3A and B show embodiments in accordance with the present invention, including a ring of closely packed holes 6 arranged concentrically around a core 2. The holes 6 may be approximately square or oblong or trapezoidal (FIG. 3A) or circular or oval or egg-shaped (FIG. 3B), for example. FIG. 3B shows a manufactured sample of hole assisted fiber. Variations in hole shape and size do not affect the overall performance of the fiber significantly provided the hole to cladding ratio around a circle is not significantly affected. As shown in these embodiments a large amount of the glass or other cladding material in one circle within the cladding and centered on the core comprises the holes, e.g. more than 60%, more than 70%, more than 80% or more than 90% or more than 95% is holes.

TABLE 3

| StdOrder | RunOrder | PtType | Blocks | d core | width arms | inner clad radius | outer holder | Tot link |
|---|---|---|---|---|---|---|---|---|
| 1 | 1 | 1 | 1 | 8.6 | 1 | 16 | 3 | 0.185 |
| 2 | 2 | 1 | 1 | 8.6 | 3 | 12 | 8 | 0.365 |
| 3 | 3 | 1 | 1 | 8 | 3 | 16 | 3 | 0.281 |
| 4 | 4 | 1 | 1 | 8.6 | 1 | 16 | 8 | 0.18 |
| 5 | 5 | 1 | 1 | 8.6 | 3 | 12 | 8 | 0.365 |
| 6 | 6 | 1 | 1 | 8.6 | 3 | 16 | 3 | 0.278 |
| 7 | 7 | 1 | 1 | 8 | 3 | 16 | 8 | 0.172 |
| 8 | 8 | 1 | 1 | 8 | 1 | 16 | 8 | 0.172 |
| 9 | 9 | 1 | 1 | 8 | 1 | 12 | 8 | 0.366 |
| 10 | 10 | 1 | 1 | 8.6 | 1 | 12 | 3 | 0.377 |
| 11 | 11 | 1 | 1 | 8 | 3 | 12 | 3 | 0.419 |
| 12 | 12 | 1 | 1 | 8 | 1 | 12 | 3 | 0.37 |

TABLE 4

| RunOrder | core radius | inner clad radius | outer r increase | capillary overlap | capillary width | IL 1310 | IL 1550 | BendLoss 1310 | BendLoss 1550 | Total 1310 | Total 1550 | Total Link (figure of merit) |
|---|---|---|---|---|---|---|---|---|---|---|---|---|
| 1 | 4.3 | 12 | 7 | 2.5 | 1 | 0.132 | 0.0539 | 0 | 2.44E−05 | 0.264 | 0.108 | 0.3715 |
| 2 | 4.3 | 16 | 4.3 | 2.5 | 2 | 0.049585 | 0.042973 | 0.00363 | 0.00036 | 0.103 | 0.0863 | 0.1891 |
| 3 | 4 | 16 | 7 | 0.5 | 2 | 0.0459 | 0.043 | 0.000001 | 1E−07 | 0.0917 | 0.0861 | 0.1778 |
| 4 | 4 | 12 | 7 | 2.5 | 1 | 0.128014 | 0.053954 | 0 | 1E−07 | 0.256 | 0.108 | 0.3639 |
| 5 | 4.3 | 12 | 4.3 | 2.5 | 2 | 0.131 | 0.0537 | 0.00227 | 0.000243 | 0.264 | 0.108 | 0.3715 |
| 6 | 4.3 | 16 | 4.3 | 0.5 | 2 | 0.0499 | 0.043 | 0.000969 | 9.94E−05 | 0.101 | 0.0861 | 0.1868 |
| 7 | 4.3 | 16 | 7 | 0.5 | 1 | 0.0499 | 0.043 | 0.000206 | 0 | 0.1 | 0.086 | 0.186 |
| 8 | 4.3 | 16 | 7 | 2.5 | 1 | 0.0497 | 0.043 | 0.000178 | 3E−07 | 0.0996 | 0.0859 | 0.1856 |
| 9 | 4 | 16 | 7 | 2.5 | 2 | 0.0456 | 0.043 | 1E−07 | 0 | 0.0912 | 0.086 | 0.1772 |
| 10 | 4.3 | 12 | 7 | 2.5 | 2 | 0.130807 | 0.053676 | 4E−07 | 1.48E−05 | 0.262 | 0.107 | 0.369 |
| 11 | 4 | 16 | 4.3 | 2.5 | 2 | 0.045619 | 0.043026 | 0.0049 | 0.000504 | 0.0961 | 0.0866 | 0.1827 |
| 12 | 4.3 | 12 | 7 | 0.5 | 2 | 0.132734 | 0.054002 | 0 | 8.5E−06 | 0.265 | 0.108 | 0.3735 |
| 13 | 4 | 16 | 4.3 | 2.5 | 1 | 0.0458 | 0.043 | 4.9E−06 | 8E−07 | 0.0916 | 0.0861 | 0.1777 |
| 14 | 4 | 12 | 7 | 0.5 | 2 | 0.129 | 0.0541 | 0 | 1E−07 | 0.258 | 0.108 | 0.366 |
| 15 | 4 | 12 | 4.3 | 2.5 | 1 | 0.128 | 0.054 | 7.11E−05 | 3.57E−05 | 0.256 | 0.108 | 0.3643 |
| 16 | 4 | 12 | 4.3 | 0.5 | 2 | 0.129 | 0.0541 | 0.000577 | 8.01E−05 | 0.259 | 0.108 | 0.3672 |
| 17 | 4.3 | 12 | 4.3 | 0.5 | 1 | 0.133211 | 0.054128 | 9.25E−05 | 2.27E−05 | 0.267 | 0.108 | 0.3748 |
| 18 | 4.3 | 16 | 4.3 | 0.5 | 1 | 0.049931 | 0.042998 | 8.5E−06 | 9.9E−06 | 0.0999 | 0.086 | 0.1859 |
| 19 | 4 | 16 | 7 | 0.5 | 1 | 0.0459 | 0.043 | 0.000053 | 1E−07 | 0.0919 | 0.0861 | 0.1779 |
| 20 | 4 | 12 | 4.3 | 0.5 | 1 | 0.129421 | 0.054217 | 0.000002 | 5.25E−05 | 0.259 | 0.108 | 0.3673 |

TABLE 5

| StdOrder | RunOrder | PtType | Blocks | inner clad radius | core radius | capillary overlap | IL 1310 | IL 1550 |
|---|---|---|---|---|---|---|---|---|
| 1 | 1 | 2 | 1 | 14 | 4 | 1.5 | 0.071085 | 0.045386 |
| 2 | 2 | 2 | 1 | 16 | 4 | 1.5 | 0.04581 | 0.043026 |
| 3 | 3 | 2 | 1 | 14 | 4.3 | 1.5 | 0.075699 | 0.045469 |
| 4 | 4 | 2 | 1 | 16 | 4.3 | 1.5 | 0.049804 | 0.04297 |
| 5 | 5 | 2 | 1 | 14 | 4.15 | 0.5 | 0.073662 | 0.045008 |
| 6 | 6 | 2 | 1 | 16 | 4.15 | 0.5 | 0.047681 | 0.042515 |
| 7 | 7 | 2 | 1 | 14 | 4.15 | 2.5 | 0.072999 | 0.044934 |
| 8 | 8 | 2 | 1 | 16 | 4.15 | 2.5 | 0.047446 | 0.042498 |
| 9 | 9 | 2 | 1 | 15 | 4 | 0.5 | 0.056011 | 0.043845 |
| 10 | 10 | 2 | 1 | 15 | 4.3 | 0.5 | 0.060408 | 0.043864 |
| 11 | 11 | 2 | 1 | 15 | 4 | 2.5 | 0.055585 | 0.043808 |
| 12 | 12 | 2 | 1 | 15 | 4.3 | 2.5 | 0.059978 | 0.043826 |
| 13 | 13 | 0 | 1 | 15 | 4.15 | 1.5 | 0.057915 | 0.043365 |
| 14 | 14 | 0 | 1 | 15 | 4.15 | 1.5 | 0.057915 | 0.043365 |
| 15 | 15 | 0 | 1 | 15 | 4.15 | 1.5 | 0.057915 | 0.043365 |

| StdOrder | BendLoss 1310 | BendLoss 1550 | Total Loss 1310 | Total Loss 1550 | Total loss (figure of merit) |
|---|---|---|---|---|---|
| 1 | 7E−07 | 1.11E−05 | 0.14217 | 0.090782 | 0.232952 |
| 2 | 0.000001 | 2E−07 | 0.091621 | 0.086053 | 0.177674 |
| 3 | 4E−07 | 9E−07 | 0.151399 | 0.090939 | 0.242338 |
| 4 | 1E−07 | 1E−07 | 0.099607 | 0.085939 | 0.185547 |
| 5 | 6E−07 | 3.74E−05 | 0.147324 | 0.090053 | 0.237377 |
| 6 | 5.2E−06 | 4E−07 | 0.095367 | 0.08503 | 0.180397 |
| 7 | 1.5E−06 | 0.000003 | 0.145999 | 0.089871 | 0.23587 |
| 8 | 0.000002 | 4E−07 | 0.094894 | 0.084997 | 0.179891 |
| 9 | 1.8E−06 | 1E−07 | 0.112023 | 0.087689 | 0.199712 |
| 10 | 2E−07 | 0 | 0.120816 | 0.087728 | 0.208544 |
| 11 | 1.7E−06 | 3E−07 | 0.111172 | 0.087617 | 0.198788 |
| 12 | 1.6E−06 | 2E−07 | 0.119957 | 0.087652 | 0.207609 |
| 13 | 8E−07 | 1E−07 | 0.11583 | 0.086731 | 0.202561 |
| 14 | 1.6E−06 | 2E−07 | 0.115831 | 0.086731 | 0.202562 |
| 15 | 1.5E−06 | 2E−07 | 0.115831 | 0.086731 | 0.202562 |

Figure 4:
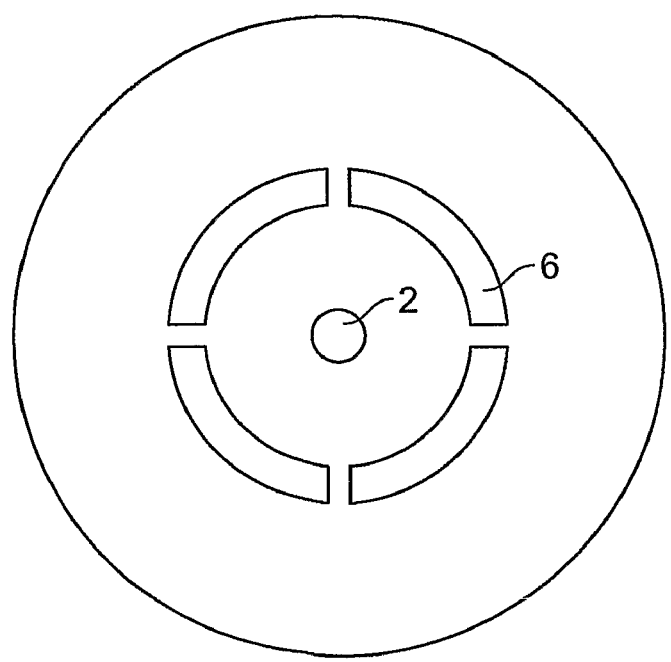

As shown in FIG. 4, the present invention also provides a fiber having a doped core 2 and incorporating a radially extended strut hole structure in the cladding that is bendable to tight radii in all directions (Embodiment II.A), e.g. to 5 mm. Table 3 gives the simulation results on this fiber. The holes 6 are arranged in the cladding concentrically around the core 2, each hole having an inner edge defined by an arc of a circle. The holes extend in the radial direction away from the core. Also in this embodiment a large amount of the glass or other cladding material in one circle within the cladding and centered on the core comprises the holes, e.g. more than 60%, more than 70%, more than 80% or more than 90% or more than 95% is holes.

Figure 5:
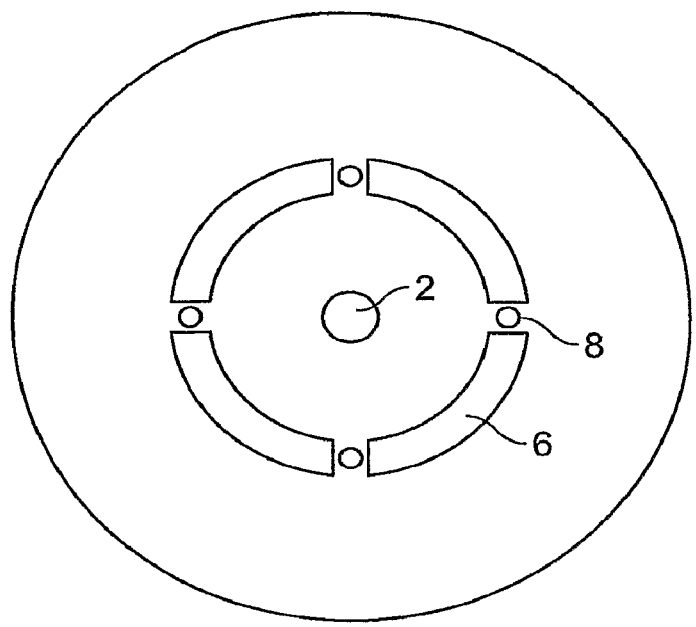
Figure 6:
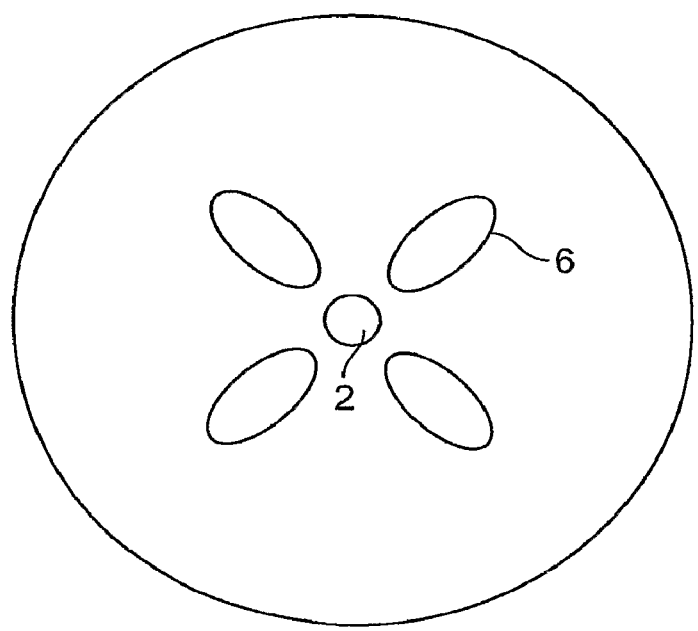
FIGS. 6 and 7 show fibers from FIGS. 1A and B of WO2006-06068709 as comparative examples.
Figure 7:
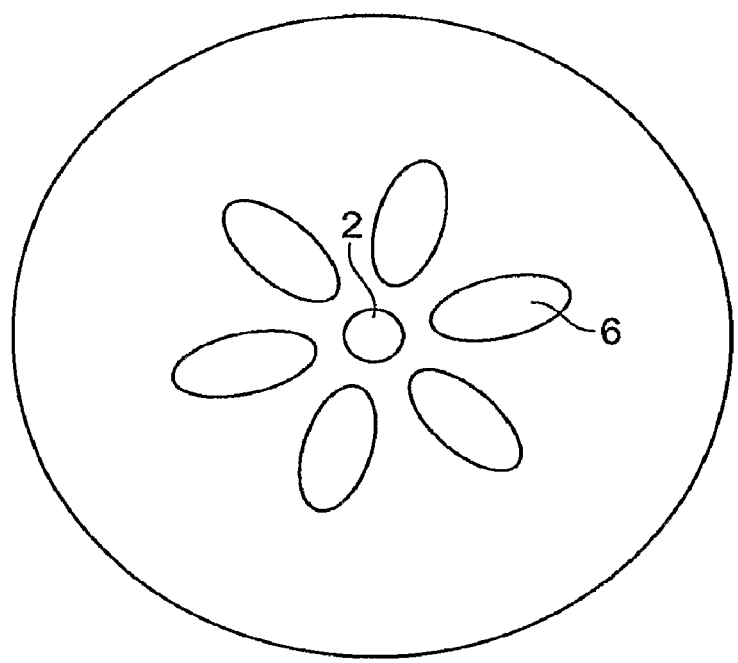

Alternatively, as shown in FIG. 5, the present invention provides a fibre with a doped core, incorporating a strut hole structures having small capillaries between the arms for better rigidity (Embodiment II.B) which can be bent to a tight radius, e.g. 5 mm. Tables 4 and 5 give the simulation results on this fiber. The holes 6 are arranged concentrically around the core 2 in the cladding, each hole being an arc of a circle with extending in the radial direction with capillaries 8 in between the holes 6. Also in this embodiment a large amount of the glass or other cladding material in one circle within the cladding and centered on the core comprises the holes, e.g. more than 60%, more than 70%, more than 80% or more than 90% or more than 95% is holes.

Simulations give the following results for a fiber with 8 solid arms between the holes (Embodiment IIa). A coupling was simulated to SMF-28 fibre giving a coupling loss at a wavelength of 1310 nm of 0.057 dB and at 1550 nm of 0.043 dB, whereas the bending loss at a bending radius of 5 mm (dB/180° at 5 mm radius) at 1310 nm was $5.909 \times 10^{-6}$ and at 1550 nm was $6.211 \times 10^{-7}$, For an identical design but with capillaries between the arms (Embodiment IIb) also simulated for a coupling to SMF-28 fibre, the coupling loss was at 1310 nm equal to 0.125 dB and at 1550 nm equal to 0.043 dB whereas the bending loss for bending at 5 mm radius (dB/180° at 5 mm radius) was at 1310 nm equal to $3.318 \times 10^{-7}$ and at 1550 nm equal to $2.138 \times 10^{-7}$, Values of total link loss with a 180° bend at 5 mm radius of 0.7 dB or less, or more preferably 0.6 dB or less or most preferably 0.5 dB or less are within the scope of the present invention.

All simulations were carried out wavelengths of light of 1310 NM and 1550 nm.

COMPARATIVE RESULTS

A comparative simulation has also been made to compare fiber designs according to WO2006-068709, The comparative examples 1 and 2 designs are shown in AT 1310 NM
Straight fiber:

1.4475 5.45356e−007 99.27 99.27
Bent fiber: 5 mm bend radius 1.44006 2200.51 9.22891e−005 9.22887e−005
AT 1550 NM
Straight fiber:

1.44626 −2.61756e−011 99.0869 99.0869
Bent fiber: 5 mm bend radius 1.44644 1574.83 64.9354 64.9351
1.43691 1470.27 0.000677896 0.000677893
1.43477 2613.06 1.35861e−007 1.35724e−007

-continued

AT 1250 NM - straight fiber 1.44785 1.32875e-005 98.3386
Summary of analysis results:
At 1310 NM:

Coupling of straight HA-fiber to SMF-28 (dB): −0.0318182
Fundamental mode propagation loss - straight fiber (dB/m): 5.45356e−007
Sum of mode propagation loss - bent fiber (dB/m): 0.00203082
Sum of mode propagation loss - bent fiber (dB/180°): −3.19e−005
At 1550 NM:

Coupling of straight HA-fiber to SMF-28 (dB): −0.0398375
Fundamental mode propagation loss - straight fiber (dB/m): −2.61756e−01
Sum of mode propagation loss - bent fiber (dB/m): 1022.63
Sum of mode propagation loss - bent fiber (dB/180°): −16.0634
Figure of Merit: total link loss = 2 × coupling loss + 180° bending loss
Total link loss = −0.0636684 at 1310 nm
Total link loss = −16.1431 at 1550 nm
Total link loss (combined) = −16.2068

Comparative Example 2

AT 1310 NM
Straight fiber:

1.44749 3.45517e−008 98.9435 98.9435
Bent fiber: 5 mm bend radius 1.44483 108.965 0.00183413 0.00183413
1.44247 858.178 0.0561168 0.0561167
1.44092 1424.01 9.91702e−007 9.91258e−007
1.43772 2130.73 2.61322e−006 2.6132e−006
AT 1550 NM
Straight fiber:

1.44626 −4.28436e−011 99.0672 99.0672
Bent fiber: 5 mm bend radius 1.4464 23.0755 89.7435 89.7435
1.44248 30.4217 0.663957 0.663957
1.44128 799.882 1.49238e−005 1.49237e−005
1.43848 664.956 3.67788e−005 3.67788e−005
AT 1250 NM - straight fiber 1.44784 −6.02216e−008 98.5891
1.44684 1.28838 0.0168615
1.44681 1.80838 −2.52533e−011
1.44641 57.6978 0.203069
1.44617 102.982 0.00335819
1.44513 689.93 0.00585656
Summary of analysis results:
At 1310 NM:

Coupling of straight HA-fiber to SMF-28 (dB): −0.0461283
Fundamental mode propagation loss - straight fiber (dB/m): 3.45517e−008
Sum of mode propagation loss - bent fiber (dB/m): 0.48365
Sum of mode propagation loss - bent fiber (dB/180°): −0.00759715
At 1550 NM:

Coupling of straight HA-fiber to SMF-28 (dB): −0.0407011
Fundamental mode propagation loss - straight fiber (dB/m): −4.28436e−01
Sum of mode propagation loss - bent fiber (dB/m): 20.9111
Sum of mode propagation loss - bent fiber (dB/180°): −0.32847
Figure of Merit: total link loss = 2 × coupling loss + 180° bending loss
Total link loss = −0.0998538 at 1310 nm
Total link loss = −0.409872 at 1550 nm
Total link loss (combined) = −0.509726

Figure 8:
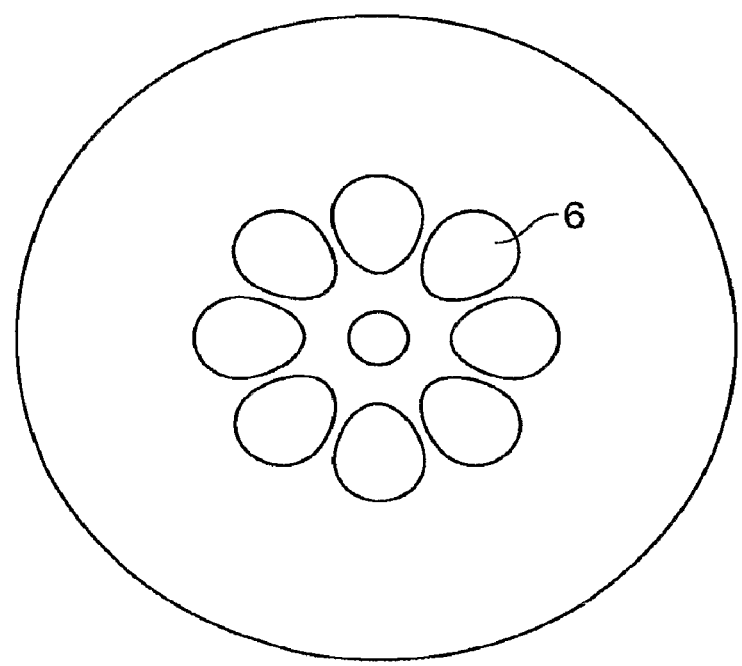
FIGS. 8-10 show optical fibers according to further embodiments of the present invention.
Figure 9:
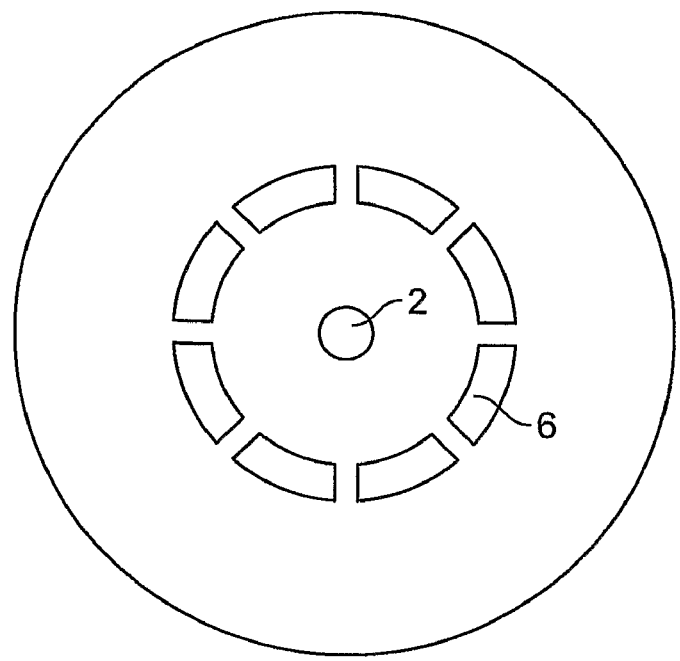
Figure 10:
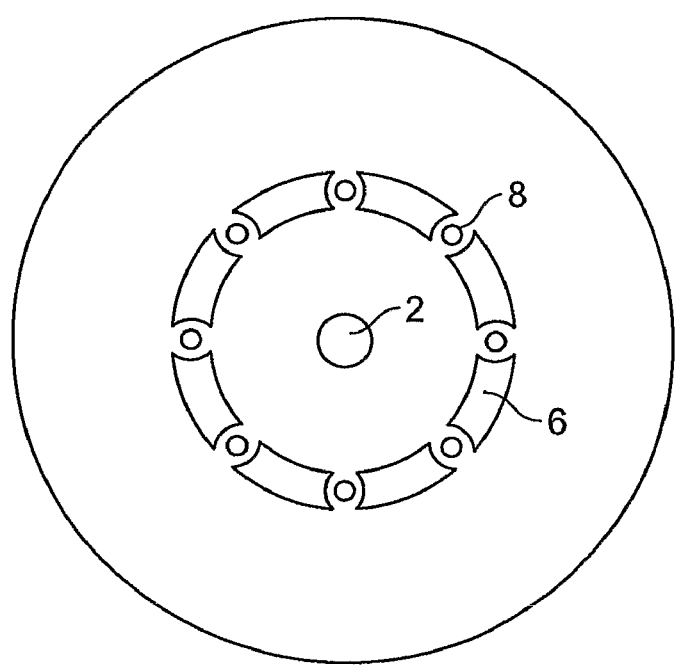

The total link loss is: −16.2068, and −0.509726, respectively. Designs according to the present invention are shown in FIGS. 8, 9, 10 with their simulation results for 180° bending loss. The total link loss is low: −0.266776, −0.200925 and −0.200659 respectively. These values are a considerable improvement and approach that of an air ring completely around the cladding (total link loss of −0.203473). FIG. 8 shows a ring of closely spaced holes arranged concentrically around a core. FIG. 9 is a fiber according to the embodiment shown in FIG. 4. FIG. 10 is a fiber according to the embodiment shown in FIG. 5. All were bent to 5 mm radius.

It is considered that a total link loss of better than 0.7, more preferably better than 0.5 dB and particularly less than 0.3 dB for 180° bend at 5 mm radius can be achieved by fibers of the present invention.

Embodiment of FIG. 8

AT 1310 NM
Straight fiber:

1.44748 2.03045e−011 97.9894 97.9894
Bent fiber: 5 mm bend radius 1.44796 1.54974e−009 62.658 62.658
1.44679 1.3774e−008 31.3944 31.3944
1.4448 −0.00156739 5.59374 5.59374
AT 1550 NM
Straight fiber:

1.44625 −1.20995e−011 98.9651 98.9651
Bent fiber: 5 mm bend radius 1.44636 6.75485e−011 93.7817 93.7817
1.44392 1.35157e−008 4.86342 4.86342
1.4435 3.7647e−009 1.95098e−005 1.95098e−005
1.44179 5.87308e−008 0.00236047 0.00236047
1.44177 6.70162e−008 1.21232 1.21232
1.44144 1.4691e−008 0.0828377 0.0828377
AT 1250 NM - straight fiber 1.44781 1.01039e−011 98.1472
1.44659 1.11831e−011 0.00694908
1.44651 −2.72607e−014 2.3191e−008
1.44577 4.86174e−011 0.014095
1.44555 2.42897e−011 1.28346e−006
1.44545 0.000170638 0.00021137
Summary of analysis results:
At 1310 NM:

Coupling of straight HA-fiber to SMF-28 (dB): −0.0882093
Fundamental mode propagation loss - straight fiber (dB/m): 2.03045e−011
Sum of mode propagation loss - bent fiber (dB/m): −8.71696e−005
Sum of mode propagation loss - bent fiber (dB/180°): −1.36926e−006
At 1550 NM:

Coupling of straight HA-fiber to SMF-28 (dB): −0.045178
Fundamental mode propagation loss - straight fiber (dB/m): −1.20995e−01
Sum of mode propagation loss - bent fiber (dB/m): 4.6944e−006
Sum of mode propagation loss - bent fiber (dB/180°): −7.37395e−008
Figure of Merit: total link loss = 2 × coupling loss + 180° bending loss
Total link loss = −0.17642 at 1310 nm
Total link loss = −0.0903561 at 1550 nm
Total link loss (combined) = −0.266776

Embodiment of FIG. 9

System Parameters:

core radius: 4.15
inner clad radius: 15

-continued hole radius: 20.5
arm thickness: 2
AT 1310 NM
Straight fiber:

1.44749 3.11912e–010 98.689 98.689
Bent fiber: 5 mm bend radius 1.44831 0.000143876 35.4569 35.4569
1.44734 0.000311282 53.8153 53.8153
1.44539 0.00123505 8.13375 8.13375
AT 1550 NM
Straight fiber:

1.44626 –3.77839e–011 99.0115 99.0115
Bent fiber: 5 mm bend radius 1.44643 3.91587e–006 91.9191 91.9191
1.44466 0.000328236 5.67297 5.67297
1.44237 0.000648903 2.24266 2.24266
AT 1250 NM - straight fiber 1.44783 2.52096e–009 98.485
1.44618 7.78256e–005 0.184536
1.44347 0.000207989 0.147032
Summary of analysis results:
At 1310 NM:

Coupling of straight HA-fiber to SMF-28 (dB): –0.0573146
Fundamental mode propagation loss - straight fiber (dB/m): 3.11912e–010
Sum of mode propagation loss - bent fiber (dB/m): 0.000376201
Sum of mode propagation loss - bent fiber (dB/180°): –5.90935e–006
At 1550 NM:

Coupling of straight HA-fiber to SMF-28 (dB): –0.0431444
Fundamental mode propagation loss - straight fiber
(dB/m): –3.77839e–011
Sum of mode propagation loss - bent fiber (dB/m): 3.95441e–005
Sum of mode propagation loss - bent fiber (dB/180°): –6.21157e–007
Figure of Merit: total link loss = 2 × coupling loss + 180° bending loss
Total link loss = –0.114635 at 1310 nm
Total link loss = –0.0862893 at 1550 nm
Total link loss (combined) = –0.200925

Embodiment of FIG. 10

System Parameters:

core radius: 4.15
inner clad radius: 15
hole radius: 20
capillary border thickness: 1.5
capillary overlap: 1.5
AT 1310 NM
Straight fiber:

1.44749 7.5619e–011 98.695 98.695
Bent fiber: 5 mm bend radius 1.44831 2.04077e–005 35.1737 35.1737
1.44733 4.06131e–005 54.0419 54.0419
1.44539 –2.99605e–006 8.15805 8.15805
AT 1550 NM
Straight fiber:

1.44626 –2.1909e–011 99.0084 99.0084
Bent fiber: 5 mm bend radius 1.44642 1.12735e–006 91.8877 91.8877
1.44466 8.77672e–005 5.7036 5.7036
1.44236 0.00046762 2.24857 2.24857
AT 1250 NM - straight fiber 1.44783 –6.9112e–011 98.4878
1.44618 –5.46195e–005 0.18924
1.44348 0.000141755 0.149065

-continued

Summary of analysis results:
At 1310 NM:

Coupling of straight HA-fiber to SMF-28 (dB): –0.0570492
Fundamental mode propagation loss - straight fiber (dB/m): 7.5619e–011
Sum of mode propagation loss - bent fiber (dB/m): 3.62208e–005
Sum of mode propagation loss - bent fiber (dB/180°): –5.68955e–007
At 1550 NM:

Coupling of straight HA-fiber to SMF-28 (dB): –0.0432798
Fundamental mode propagation loss - straight fiber (dB/m): –2.1909e–011
Sum of mode propagation loss - bent fiber (dB/m): 1.70009e–005
Sum of mode propagation loss - bent fiber (dB/180°): –2.67049e–007
Figure of Merit: total link loss = 2 × coupling loss + 180° bending loss
Total link loss = –0.114099 at 1310 nm
Total link loss = –0.0865599 at 1550 nm
Total link loss (combined) = –0.200659

The novel fibers of the present invention allow good mechanical coupling to a single mode fiber, e.g. a G.653 fiber The novel fibers of the present invention also allow easy fusion splicing to a single mode fiber such as a G.653 fiber.

Fibers of the present invention allow for bending radii of about 5 mm with negligible total link loss penalty.

According to a second aspect of the present invention, a butt coupler is provided for coupling light between ends of at least two optical fibers, the ends facing in substantially the same direction as each other, wherein the coupler comprises a length of light guide member curved approximately or exactly 90 or approximately or exactly 180° around a radius of 5 mm or less, or to any intermediate angle, and comprises holding means holding opposite ends of the light guide member at a distance from each other corresponding to the separation distance at which the respective ends of the said optical fibers are to be coupled, wherein the said light guide member is a length of hole-assisted photonic crystal optical fiber (HA-PCF). The present invention in particular relates to a fused-fiber optical coupler. The present invention also provides a plug-in coupler. The fibers may be aligned, e.g. using an aligner or non-aligned.

When used in a butt coupler, in one region, the fiber has a substantial bend so that the main length of the fiber on one side of the selected region is oriented at a substantial angle to the axis of the length of the fiber on the other side of the region. In various embodiments the bend angle can be about 90° or about 180°. The bent region can be bent tightly around a small diameter support and in certain embodiments the bent region can be wrapped a multiplicity of turns around the small diameter support. Such devices are known in principal from U.S. Pat. No. 5,138,676, however without having the novel features of the present invention.

A fiber optic device according to the present invention may have a fusion splice and a bend. For example, the device can be formed from two optical fibers one of which is a fiber according to the present invention and the other may be another type of fiber, e.g. a single mode fiber. To prepare the coupler, ends of the fibers can have the polymer buffers or jackets removed. The fibers can be joined by a fusion splice in a splice region. The bend which can be a 180° bend is formed in the fiber according to the present invention. Such a splice with a 180° bend is convenient to use and is small in size.

The splice between the two fibers may be formed using conventional fusion splice technology with known fusion splice equipment. The fiber ends can be cleaved and cleaned. The fiber ends can be aligned, e.g. using an aligning device, such as a device having a groove into which the fibers are placed. The end faces of the fibers are then brought into contact. The fibers are then joined by heating the fusion region, for example, using a torch or electric arc.

The bend is formed in any suitable manner known in the art. Alternatively, the fusion splice equipment may include a suitable movable support to bend the one fiber over to the appropriate angle. The bend angle may be chosen as necessary for the particular application, e.g. 180°. Other bend angles may be provided, however. For example, a bend angle of 90°, or an intermediate angle, e.g. a bend angle of 45°.

The splice and bend are preferably supported by a suitable support structure or housing. The two fibers may be retained within the housing by a suitable adhesive, as known in the art. The bend is preferably supported so that it does not-touch the sides of the housing, which could degrade the optical performance therein.

Figure 11:
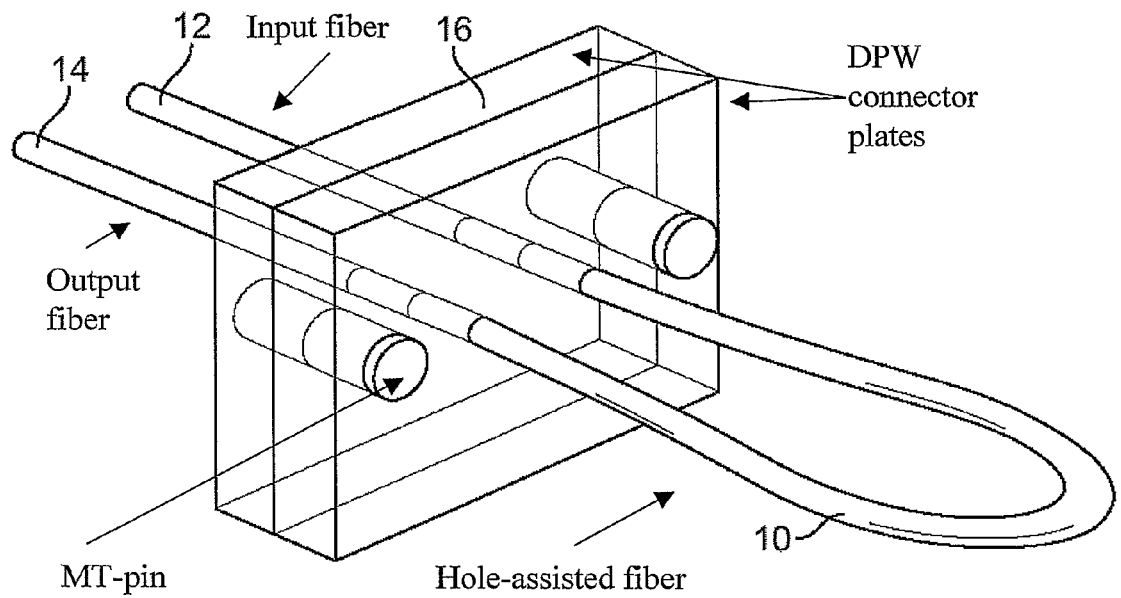
Figure 12A:
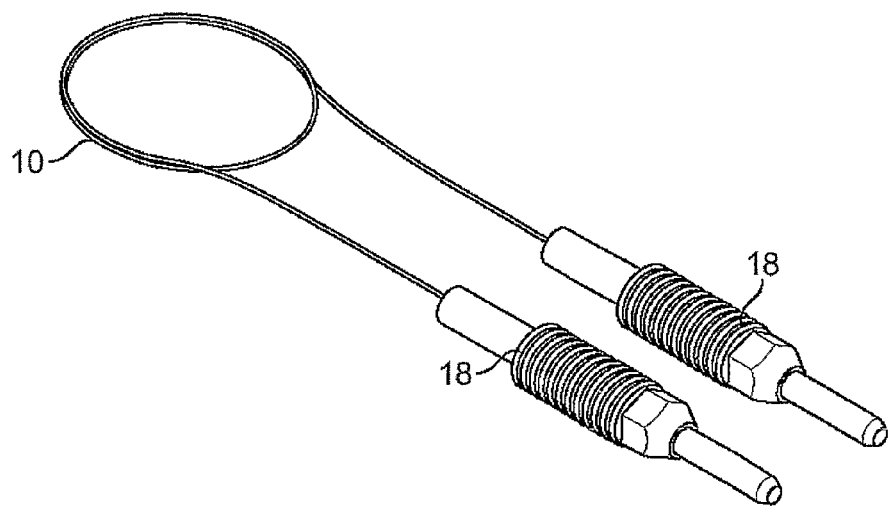
Figure 12B:
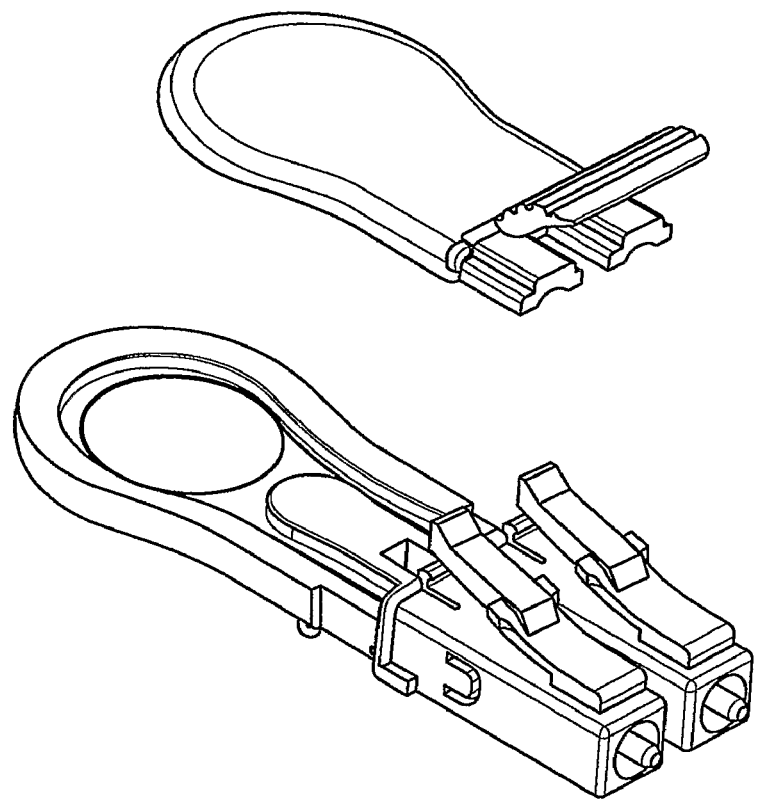
Figure 12C:
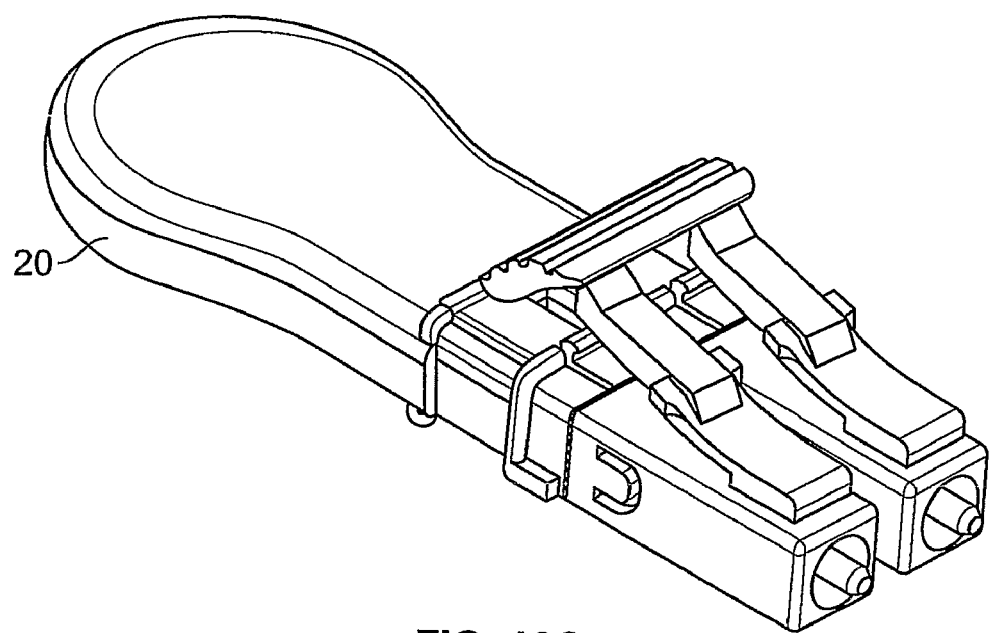

FIGS. 11 to 13 show various optical devices that may make use of the present invention. They show various types of bun coupler for coupling light between ends of at least two optical fibers, the ends facing in substantially the same direction as each other, wherein the coupler comprises a length of light guide member curved around a radius of 5 mm or less, and holding means holding opposite ends of the light guide member at a distance from each other corresponding to the separation distance at which the respective ends of the said at least two optical fibers are to be coupled, wherein the said light guide member is a length of fiber according to any of the embodiments of the present invention. FIG. 11 shows an optical device for butt coupling the end facets of parallel positioned fibers comprising a hole assisted fiber 10 according to the present invention bent through about 180°, a block 16 including mechanical or fusion connections to an input 12 and an output fiber 14. The input and/or output fibers 12, 14 can be SMF-28 fibers. Pre-alignment is preferred to deal with the problem of limited angular positioning accuracy of the micro-holes in the block 16.

As shown in FIG. 12a, b, c, a, d fiber 10 according to the present invention can be formed into a 180° loop. The fiber ends are glued into two ferrules 18 (FIG. 12a). This arrangement may then be located in a housing 20 of a 180° socket 22 (FIGS. 12b and c). This structure may now be connected to single fibers 12, 14 via a dual connector adapter 24. The socket 20 is plugged into one side of the dual connector adapter 24 and the single fibers 12, 14 are plugged into the relevant openings on the other side of the adapter 24 (FIG. 12d). The connections can be permanent or demountable. Similar designs may be included into termination boxes in each of which a plurality of 180° bend fibers 10 according to the present invention are located within the box and connected via appropriate connectors to outlets of the box. Ends of single fibers 12, 14 may then be plugged into the outlets as described above.

FIGS. 13a and b show a mechanical 180° socket 20. FIG. 13a shows the 180° bend fiber 10 according to the present invention installed in a socket 20. The ends of the fiber 10 according to the present invention are spliced into one ends of two mechanical splices 26. The mechanical splices 26 can be as described in US 2007 0047883 which is incorporated herein by reference. The single fibers 12, 14 are spliced into the other ends of the mechanical splices 26.

The invention claimed is:

1. A microstructured optical fiber having a doped solid core region and a cladding region, a plurality of holes being provided in the cladding region, being distanced from the core region and extending longitudinally along the length of fiber, wherein at least one circle is superimposed within the cladding region and centered on the core region, the holes being intersected by the at least one circle, and the holes having a radius of at least approximately 25 µm and a distance between a center of the core and an inner surface of the hole is less than approximately 15 µm, wherein the holes comprise more than 70% of the total material along the circle.

2. The fiber of claim 1 wherein the plurality of holes are two D-shaped holes with the flat sides of the D facing each other.

3. The fiber of claim 1, wherein the plurality of holes surround the core region concentrically in the form of a ring.

4. The fiber of claim 3 wherein the holes have inner edges facing the core defined by arcs of a circle, the holes extending out in the radial direction.

5. The fiber of claim 4 wherein the inner edges are defined by arcs of equal length.

6. The fiber of claim 4, wherein between the holes formed of arcs of a circle, capillaries are provided.

7. The fiber of claim 1 wherein, the holes are filled with a gas or liquid having an index of refraction less than that of the cladding region.

8. The fiber of claim 1 wherein the total link loss with a 180° bend of 5 mm radius is 0.7 dB or less.

9. The fiber of claim 1, wherein the holes comprise more than 80% of the total material along the circle.

10. The fiber of claim 1, wherein the holes comprise more than 90% of the total material along the circle.

11. The fiber of claim 1, wherein the holes comprise more than 95% of the total material along the circle.

12. The fiber of claim 1, wherein the radius of the holes is approximately 30 µm.

13. The fiber of claim 1, wherein the distance between the center of the core and the inner surface of the hole is approximately 8 µm to approximately 14 µm.

14. The fiber of claim 13, wherein the distance between the center of the core and the inner surface of the hole is approximately 11 µm to approximately 12 µm.

15. A butt coupler for coupling light between ends of at least two optical fibers, the ends facing in substantially the same direction as each other, wherein the coupler comprises a length of light guide member curved around a radius of 5 mm or less, and holding means holding opposite ends of the light guide member at a distance from each other corresponding to the separation distance at which the respective ends of the said at least two optical fibers are to be coupled, wherein the said light guide member is a length of a microstructured optical fiber having a doped solid core region and a cladding region, a plurality of holes being provided in the cladding region, being distanced from the core region and extending longitudinally along the length of fiber, wherein at least one circle is superimposed within the cladding region and centered on the core region, wherein the holes comprise at least approximately 70% to at least approximately 95% of the total material along the circle.

16. The butt coupler of claim 15 wherein the plurality of holes are two D-shaped holes with the flat sides of the D facing each other.

17. The butt coupler of claim 15, wherein the plurality of holes surround the core region concentrically in the form of a ring.

18. The butt coupler of claim 17 wherein the holes have inner edges facing the core defined by arcs of a circle, the holes extending out in the radial direction.

19. The butt coupler of claim 18 wherein the inner edges are defined by arcs of equal length.

20. The butt coupler of claim 18, wherein between the holes formed of arcs of a circle, capillaries are provided.

21. The butt coupler of claim 15, wherein, the holes are filled with a gas or liquid having an index of refraction less than that of the cladding region.

22. The butt coupler of claim 15, wherein the coupler is a fused-fiber optical coupler.

23. The butt coupler of claim 15, wherein the coupler is a mechanical or plug-in coupler.

24. The butt coupler of claim 15, wherein the opposite ends of the light guide member are connected to an adapter, further comprising at least two pluggable connectors for connecting to the at least two optical fibers.

* * * * *